Jan. 7, 1969  C. J. WHILEMS  3,420,603

OPTICAL WINDOWS FOR LASERS

Filed March 20, 1964

CHARLES JOSEPH WHILEMS
*Inventor*

By *ER Hyde Jr,*
*Attorney*

United States Patent Office 3,420,603
Patented Jan. 7, 1969

3,420,603
OPTICAL WINDOWS FOR LASERS
Charles Joseph Whilems, Forest Road, Fairlop,
Ilford, Essex, England
Filed Mar. 20, 1964, Ser. No. 353,354
Claims priority, application Great Britain, Mar. 21, 1963,
11,297/63
U.S. Cl. 350—319     2 Claims
Int. Cl. G02f 3/00

ABSTRACT OF THE DISCLOSURE

A sealed optical cell for a gas laser tube has an optical window peripherally sealed to the end bulb of the cell, and an abrupt change of thickness between the central portion of the window and the outer portion which is sealed to the bulb provides a stress barrier to prevent distortion of the central portion of the window.

---

This invention relates to optical windows for use with sealed optical cells, a typical example being a Brewster window for a gas phase laser. Such windows must be fixed to the cell so as to make a tight seal to prevent any leakage either from within or without the cell and they also need to be as nearly optically flat as possible. These two requirements conflict, since in obtaining suitable anchorage of the window, stresses are set up in the window material and cause deviations of the window surfaces from the required flatness.

According to the present invention an optical window for such a cell comprises a substantially optically flat central portion and an outer portion of reduced thickness. The thickness of the outer portion must be sufficiently smaller than that of the central portion as to absorb substantially all mechanical stresses transmitted from the body of the cell. This outer portion preferably constitutes a flange by means of which the window may be anchored but alternatively it may merely constitute a joining portion between the central portion and an outer anchoring portion. In either case the existence of the portion of reduced thickness, by absorbing mechanical stresses transmitted from the body of the cell thus avoids distortion of the central portion. Such mechanical stresses may result from the process of anchoring the window to the body of the cell or may result from temperature gradients in the body of the cell which arise during operation. Such stresses are most likely to arise when the window is anchored by direct fusion but a certain amount of heat is usually necessary even if the window is secured in position by adhesion or cementing and this also can give rise to stresses. Moreover when using the fusion technique less heat is needed to make a joint between the wall of the cell and a flange of reduced thickness.

The relative thicknesses of the central portion and the outer portion depend on a number of factors but are primarily governed by the characteristics of the cell itself. The most important factors are the size of the cell to which the window is to be fitted and the conditions within and without the tube during operation. Another important factor is the modulus of elasticity of glass being used, e.g. whether this is fused quartz or crystal. Whatever the type of cell and whatever the type of glass used, however, it is possible to select appropriate dimensions to obtain the desired result, namely, of absorbing mechanical stresses sufficiently to avoid distortion of the optically flat portion of the window.

Figure 1:
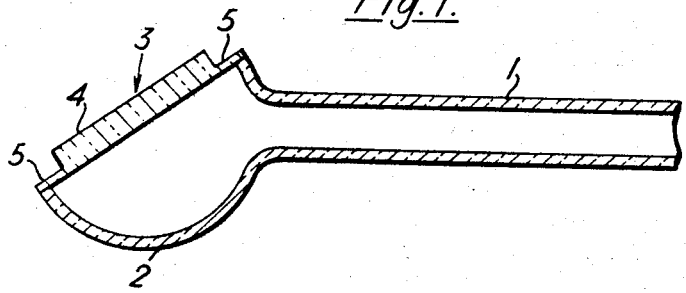
Figure 2:
Figure 3:
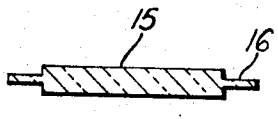

Constructions in accordance with the invention will now be described in more detail with reference to the accompanying drawings in which:

FIGURE 1 is a sectional view of the end of a plasma tube for visible light; and, FIGURES 2 and 3 are corresponding views to the same scale of alternative constructions of window for use with the cell of FIGURE 1.

The operating components of the cell shown in FIGURE 1 form no part of the present invention and are, therefore, not illustrated. The part of the cell which is shown in the drawing comprises a tubular portion 1 terminating in an offset hemispherical bulb 2. The flat side of the bulb makes an angle of approximately 30° with the axis of the tube 1 and is closed by an optical window 3 constructed in accordance with the invention. This comprises an optically flat central portion 4 and an outer portion 5 of reduced thickness which is anchored to the flat side of the bulb 2. Before assembly the central portion 4 is ground and polished so as to be optically flat and when secured in position by a heat sealing process it is found that the flatness of the central portion is maintained, any mechanical stresses having been taken up by the outer portion 5. During subsequent operation it is also found that any stresses developed in the walls of the bulbs 2 are similarly absorbed and not transmitted to the optically flat portion 4.

In a particular example of the construction illustrated the bulb 2 was of 23 mm. diameter while the thickness of edge at the point of sealing to the window 3 was 1½ mm. The window 3 had a circular central portion 4 3 mm. thick and 17 mm. in diameter while the surrounding flange 5 was ½ mm. thick and 3 mm. wide. The window 3 was made of fused silica and it was found that with the proportions just described the central portion 4 remained optically flat both after sealing and during operation of the tube.

The window shown in FIGURE 2 is also suitable for a tube such as that of FIGURE 1. The window comprises a central optically flat portion 11 and a thinner outer portion 12 connecting the central portion to an anchorage portion 13 of the same thickness of the central portion 11. The presence of the portion 12 of reduced thickness prevents the transmission to the central portion of any mechanical stresses sufficiently great to cause distortion.

The window of FIGURE 3 is similar to that of FIGURE 1 having a central optically flat portion 15 but its outer flange 16 is symmetrically located in relation to the central portion rather than located to one side of it as shown in FIGURE 1. Once again the presence of this flange avoids distortion of the central portion 15.

It will be seen that in each of the constructions illustrated there is an abrupt change of thickness from the central portion to the outer portion and this is found to be an important factor in avoiding the transmission of mechanical stress.

I claim:

1. A sealed optical cell having an end bulb to which bulb an optical window is sealed at the Brewster angle, wherein the optical window comprises an optically flat central portion of uniform thickness throughout, an outer portion having a thickness equal to that of the central portion sealed to the bulb, and a band circumscribing said central portion and joining same to said outer portion, said band being of a thickness materially less than the thickness of said central portion and said outer portion and of a width sufficient to prevent the transmission of any mechanical stresses to the optically flat central portion.

2. In a sealed optical cell having an end portion presenting an edge defining an inclined opening and an optical window closing said opening at the Brewster angle, the improvements comprising: said window having an optically flat central portion of uniform thickness throughout and of an area less than the area of said opening, and a marginal portion circumscribing said central portion, said marginal portion being peripherally sealed to said edge of said end portion, and there being a band within said marginal portion which extends inwardly from said edge to said optically flat central portion, said band being of substantially uniform thickness throughout which is materially less than the thickness of said optically flat central portion, whereby deformation due to stress in said window is preferentially absorbed in said band.

References Cited

UNITED STATES PATENTS 3,183,937   5/1965   Earley et al. _____ 331—94.5 XR
3,210,687   10/1965  Boyd et al. _____ 331—94.5

OTHER REFERENCES

Baird et al.: "Construction of a Gaseous Optical Maser Using Brewster Angle Windows," The Review of Scientific Instruments, vol. 34, No. 6, June 1963, p. 697.

JEWELL H. PEDERSEN, *Primary Examiner.*

F. L. EVANS, *Assistant Examiner.*

U.S. Cl. X.R.

331—94.5